Aug. 21, 1956 L. I. KRAMER 2,759,203
METHOD OF AND MECHANISM FOR SEPARATING A BUNDLE LENGTH
OF SIGNATURES FROM A PACK OF SIGNATURES
Filed March 26, 1954 10 Sheets-Sheet 1

FIG.1

Inventor:
Lawrence I. Kramer
By: Schroeder, Hofgren,
Brady & Wegner
Attorneys

Aug. 21, 1956   L. I. KRAMER   2,759,203
METHOD OF AND MECHANISM FOR SEPARATING A BUNDLE LENGTH
OF SIGNATURES FROM A PACK OF SIGNATURES
Filed March 26, 1954   10 Sheets-Sheet 4

Aug. 21, 1956  L. I. KRAMER  2,759,203
METHOD OF AND MECHANISM FOR SEPARATING A BUNDLE LENGTH
OF SIGNATURES FROM A PACK OF SIGNATURES
Filed March 26, 1954  10 Sheets-Sheet 5

Inventor:
Lawrence I. Kramer
By Schroeder, Hofgren,
Brady & Wegner
Attorneys

Aug. 21, 1956                L. I. KRAMER                 2,759,203
       METHOD OF AND MECHANISM FOR SEPARATING A BUNDLE LENGTH
               OF SIGNATURES FROM A PACK OF SIGNATURES
Filed March 26, 1954                              10 Sheets-Sheet 6

Inventor:
Lawrence I. Kramer
By Schroeder, Hofgren,
   Brady & Wegner
        Attorneys

Aug. 21, 1956 L. I. KRAMER 2,759,203
METHOD OF AND MECHANISM FOR SEPARATING A BUNDLE LENGTH
OF SIGNATURES FROM A PACK OF SIGNATURES
Filed March 26, 1954 10 Sheets-Sheet 8

Inventor:
Lawrence I. Kramer
By: Schroeder, Hofgren,
Brady & Wegner
Attorneys

Aug. 21, 1956             L. I. KRAMER             2,759,203
METHOD OF AND MECHANISM FOR SEPARATING A BUNDLE LENGTH
OF SIGNATURES FROM A PACK OF SIGNATURES
Filed March 26, 1954             10 Sheets-Sheet 10

United States Patent Office 2,759,203
Patented Aug. 21, 1956

2,759,203

METHOD OF AND MECHANISM FOR SEPARATING A BUNDLE LENGTH OF SIGNATURES FROM A PACK OF SIGNATURES

Lawrence I. Kramer, Park Forest, Ill., assignor to R. R. Donnelley & Sons Company, a corporation of Illinois Application March 26, 1954, Serial No. 418,814

16 Claims. (Cl. 11—1)

This invention relates to printing press and binding work, and more particularly to a novel method and mechanism for separating successive bundle lengths of signatures from a pack to which assembled signatures are constantly being added to facilitate the formation of signature bundles which may be conveniently handled and transferred to a remote position for storage or for use in assembling completed books, catalogs or other printed materials.

The usual practice in making up a catalog of the type used by mail order houses and the like has been to print certain pages on a printing press and process them through a folder, which may be integral with the printing press or a separate machine, and automatically fold the sheets into page size units which are known as signatures. The signatures are delivered one at a time at a fast rate from the folding unit and are then picked up by hand, jogged into alignment and placed on platforms, pallets, or in trucks for removal to storage or to subsequent processing operations. As the signatures delivered by one folder represent but a small portion of the final assembly, it is necessary to bring other packs (or groups) of signatures from other folders to the assembly operation. As there are physical limitations to the size of the package a worker can conveniently handle, a great deal of labor is involved in getting the signatures from the folders to the subsequent processing operations.

The present invention is for use with a signature bundling machine which forms individual signatures into logs or bundles of varying sizes to obviate much of the labor previously involved in removing signatures to storage or subsequent processing operations. The signature bundles may weigh about 300 pounds and be handled by special conveyors.

The primary object of the present invention is to provide a mechanism for separating a bundle length from a pack of assembled signatures as the signature bundling machine is adding signatures to the pack.

Another object of the invention is to provide a novel braking means which will hold the separating mechanism and the remainder of a signature pack in place as a bundle length of signatures is drawn away from the remainder of the pack. While the signature bundle is being separated, the braking means permits the remainder of the pack to recede under the action of a pusher plate adding more signatures to the pack.

A further object of the invention is to provide a safety control device associated with the separating mechanism so that the mechanism cannot be extended into the pack when the pusher plate is adding another signature to the pack.

The invention is illustrated in a preferred embodiment in the accompanying drawings, in which.

Figures 2, 3:
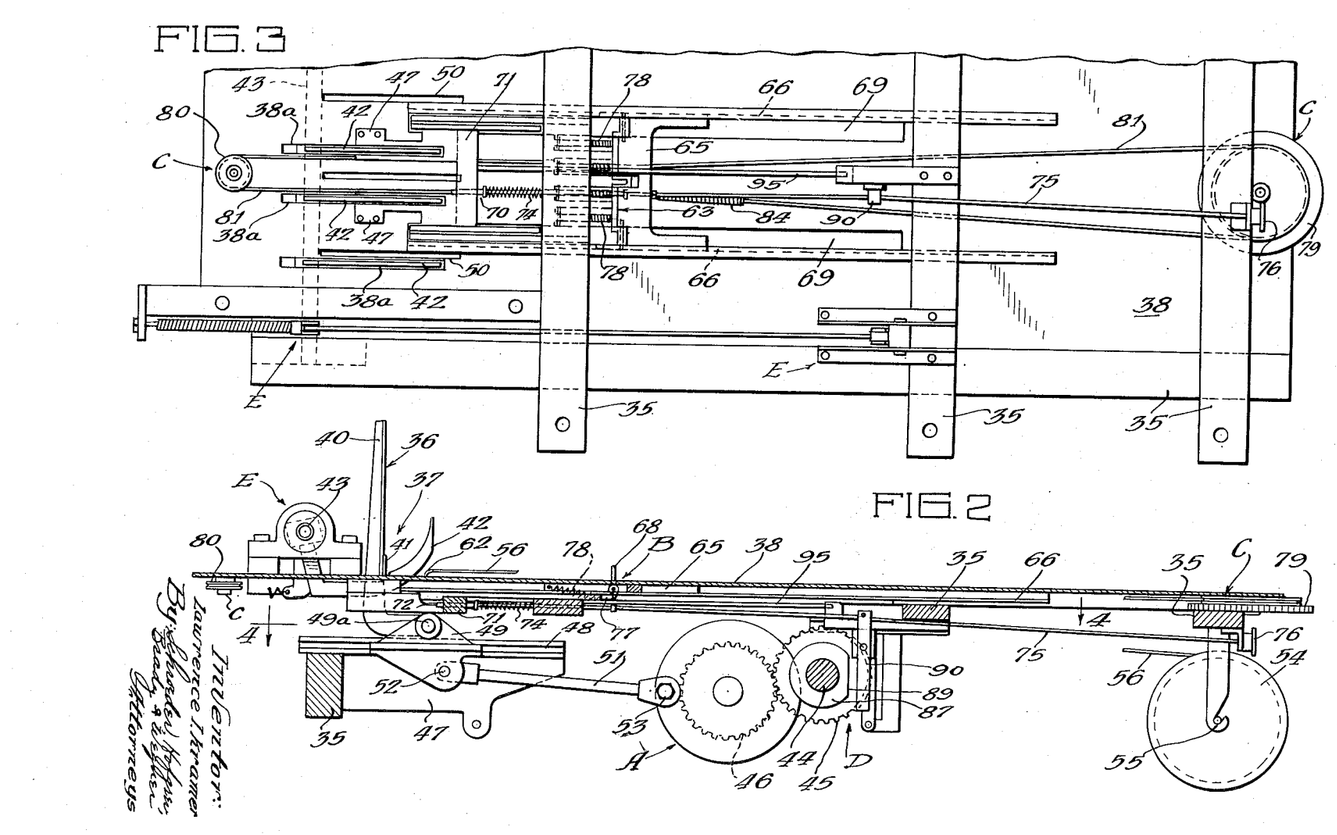
Fig. 2, a sectional view on an enlarged scale taken as indicated on line 2—2 of Fig. 1, the signature bundle and parts of the brake mechanism being omitted for clarity of illustration.
Fig. 3, a fragmentary bottom plan view of the signature bundling machine showing the separating mechanism and the braking device for one side of the machine.
Figure 4:
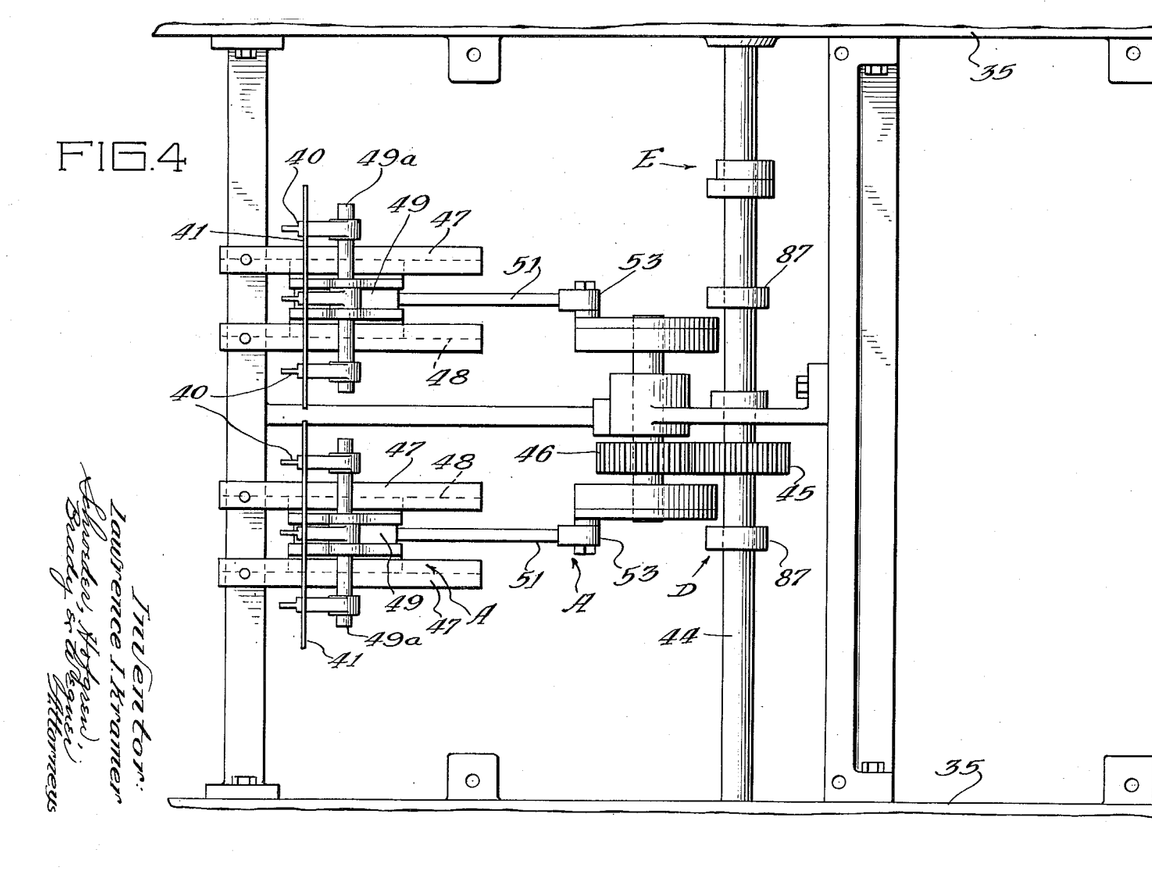
Fig. 4, a sectional view taken as indicated on line 4—4 of Fig. 2.

In the embodiment illustrated, as best seen in Fig. 2, a drive means A is provided to impart reciprocatory motion to a pusher plate 36. The pusher plate moves forwardly and rearwardly of a table 38 surmounting a frame 35 to open and close a signature receiving pocket 37 between the pusher plate 36 and the assembling pack of signatures, generally designated 39. The pusher plate may comprise a series of upstanding elements 40 (Fig. 6) joined at their lower extremities by a cross-bar 41 which slides on the top of the table 38.

Figure 7:
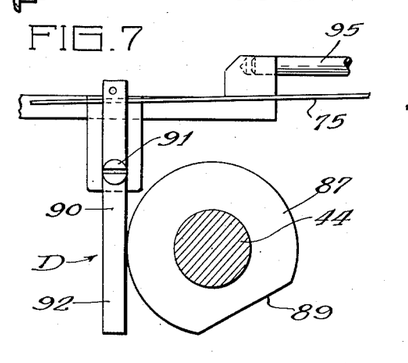
Fig. 7, a side elevational view of the safety control device, on an enlarged scale, positioned to prevent the release of the separating mechanism.
Figure 8:
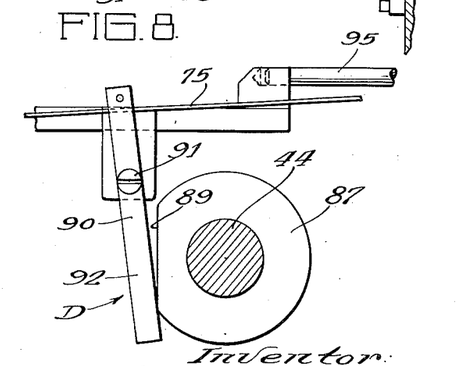
Fig. 8, a view similar to Fig. 7 showing the safety control device as it is positioned for release of the separating mechanism.

Referring again to Fig. 2, a mechanism for separating a pack of assembled signatures into bundle lengths is generally designated by B, and C refers to a yieldable braking device for regulating the slidability of the separating mechanism when it is in extended position in the signature pack. The safety control device D, as best shown in Figs. 2, 7 and 8, is operably connected to the drive means A and the separating mechanism B and prevents actuation of the separating mechanism when the pusher plate 36 has moved rearwardly of the machine to close the pocket 37.

Figures 5, 6:
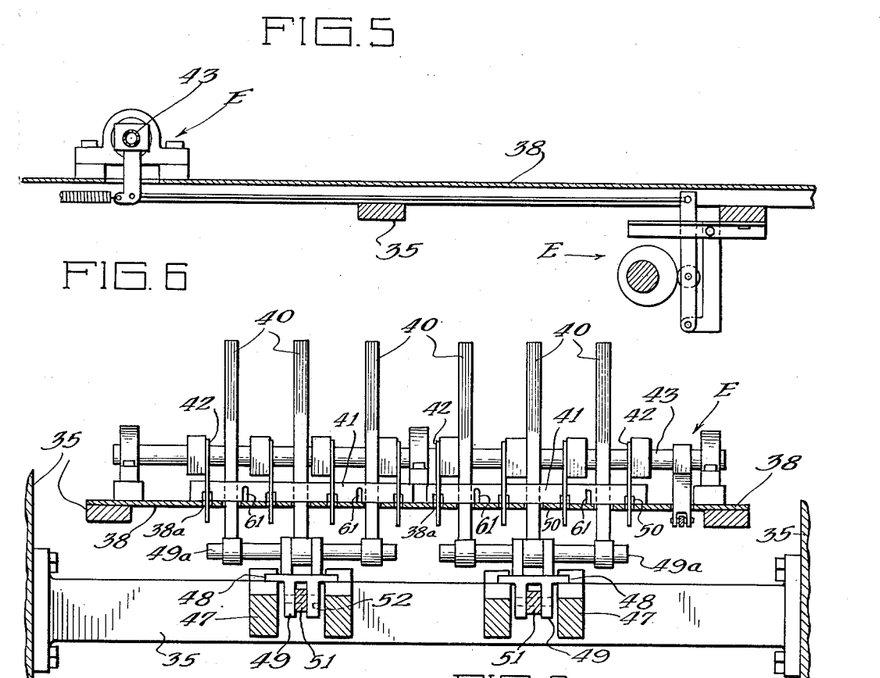
Fig. 5, a sectional view taken as indicated on line 5—5 of Fig. 1.
Fig. 6, a sectional view taken as indicated on line 6—6 of Fig. 1.
Figure 19:
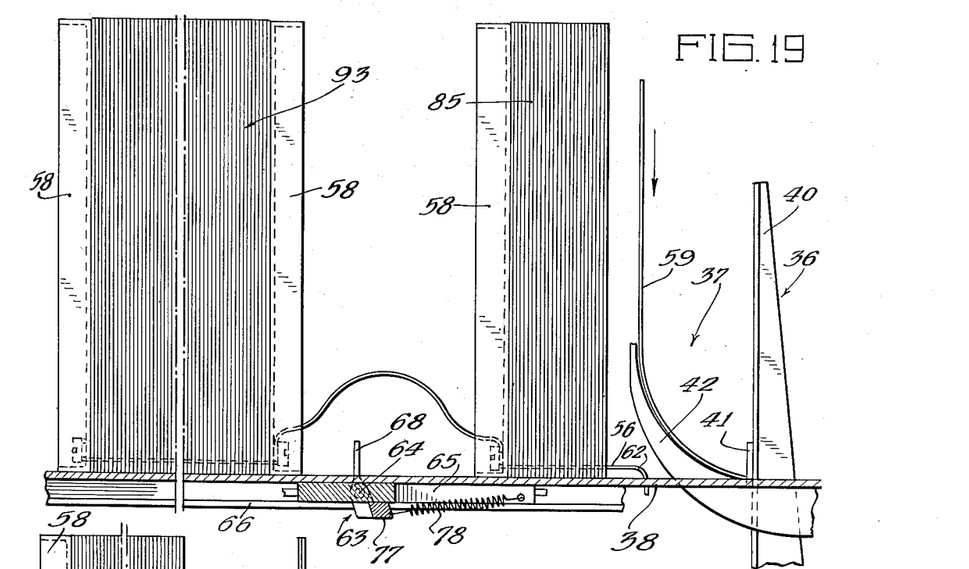
Fig. 19, a fragmentary side elevational view, partly in section, showing a bundle length of signatures being separated from the remainder of the pack.

The signature deflector arms and their actuating mechanism, generally designated E, and best seen in Figs. 5 and 6, are the subject of a co-pending application of this inventor. For the present purposes it is sufficient to say that the deflector arms 42 are extended into, and retracted from, the pocket 37, by the rock shaft 43 in timed relation to the opening and closing of the pocket 37 by the pusher plate 36. Slots 38a are provided in the table 38 to accommodate the oscillating deflector arms 42. When the deflector arms 42 are in extended position, a signature 59 is dropped into the pocket 37 striking the arms 42. The deflector arms cause the signature to bulge rearwardly as it is deflected against the cross-bar 41 of the pusher plate 36, as seen in Fig. 19. The actuating mechanism is shown in Fig. 5 and will be more fully described in said co-pending application.

The signature bundling machine shown in the drawings is constructed to build up two parallel packs of signatures. Since the operation of each side of the machine is the same, the description will be limited to a single side.

Referring again to Fig. 2, the drive means A is powered from a drive shaft 44 mounting a gear 45 which intermeshes with an idler gear 46. Bracket members 47, secured to the frame 35, have a pair of opposed grooves 48 providing guideways in which a cross-head 49, having a transverse rod 49a mounting the pusher plate 36, is free to slide. Longitudinal slots 50 in the table 38 permit the upstanding elements 40 of the pusher plate to reciprocate longitudinally of the table 38. Driving links 51 are pivotally connected at 52 to the cross-head 49, and eccentrically of the idler gear 46 at 53, so that rotation of the drive shaft 44 causes rotation of the idler gear 46, which drives the links 51 causing the cross-head 49 to reciprocate in the guideway formed by the grooves 48.

As seen in Fig. 2, spools of wire 54 are loosely journaled in hooks 55 depending from the frame 35. A wire 56 from each of the spools 54 is passed through tensioning pulleys, not shown, and upwardly through openings 57 in the table 38 where the wires are bent parallel to the table and are anchored to an abutment plate 58 (see Fig. 19). Each of the signatures 59 has a pair of slits 60 in its folded edge. The signatures 59 are dropped into the pocket 37, slit portion first, where the arms 42 deflect the slit portion forwardly against the cross-bar 41 of the pusher plate 36, the cross-bar being provided with a pair of notches 61 to accommodate the wires 56 extending parallel to the table 38 (Fig. 6). In closing the pocket 37, the pusher plate forces the slits 60 on the individual signatures about the bend 62 in the wires 56 so that the slit portion of the signature frictionally grips the wire. As the pack gradually builds up, the abutment plate 58 is pushed rearwardly on the table by the pusher plate, and additional wire is pulled from the spools 54 through the openings 57 in the table.

Figure 9:
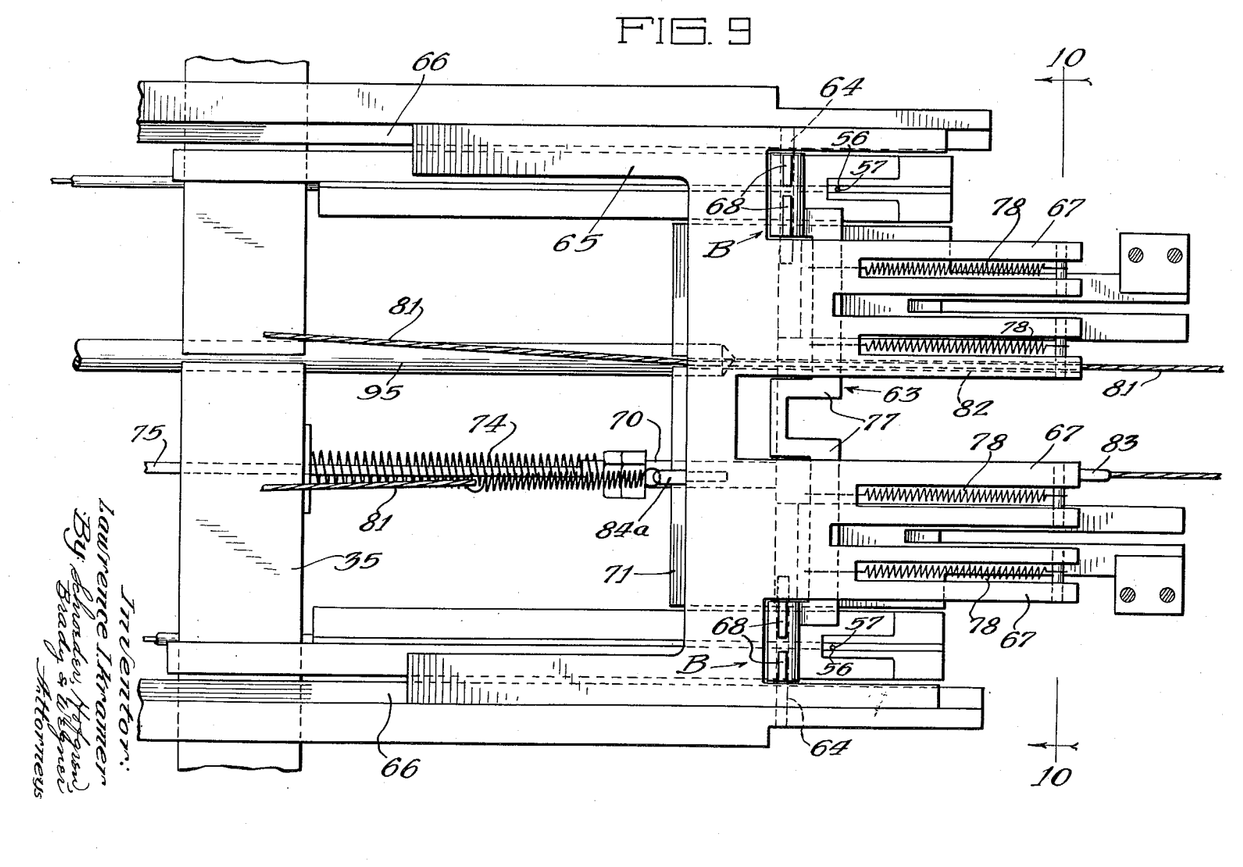
Fig. 9, a fragmentary top plan view on an enlarged scale of the separating mechanism for one side of the signature bundling machine.
Figure 10:
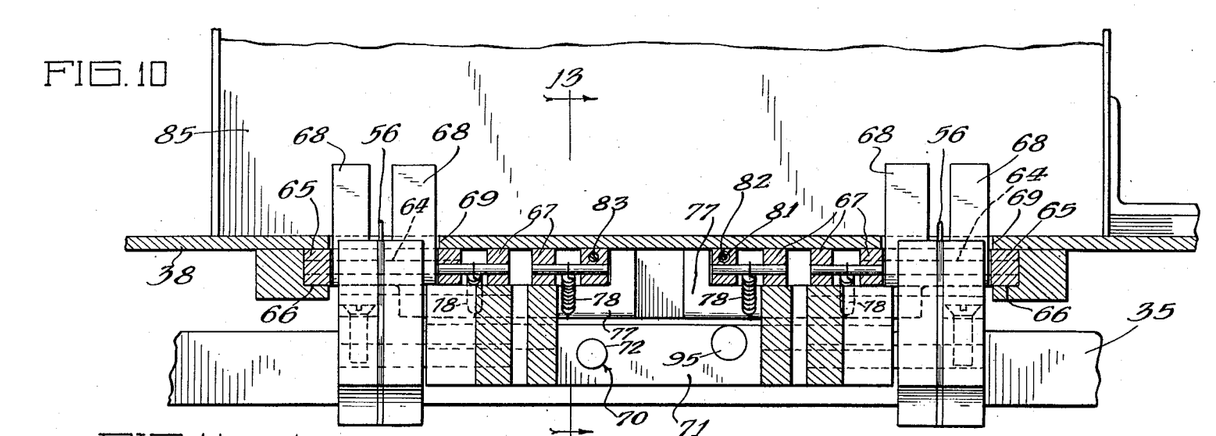
Fig. 10, a sectional view taken as indicated on line 10—10 of Fig. 9.
Figure 11:
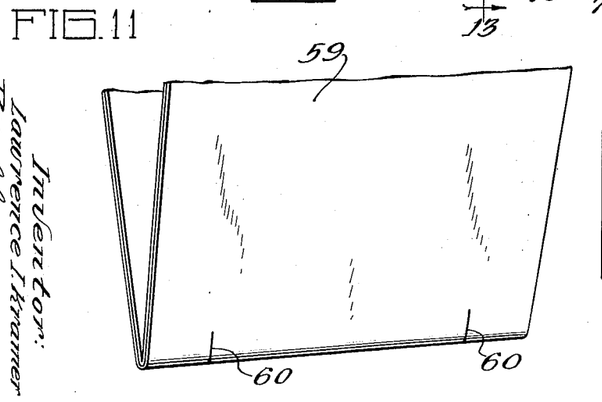
Fig. 11, a perspective view of a slitted signature.

Referring to Figs. 3 and 9, the signature bundle separating mechanism, generally designated B, includes a divider member 63 having a pair of pins 64 journaled in a longitudinal traverse member 65 which slides in a pair of channels or guideways 66 in the table 38. The traverse member 65 is provided with fingers or tynes 67 so that the deflector arms 42 and pusher plate 36 will not strike said member in its forward position. The divider member may have two pairs of fingers 68 which, when turned to extended position, project through a pair of parallel slots 69 in the table 38. One finger of each pair extends upwardly on either side of the wire 56, as best seen in Fig. 10.

Figure 13:
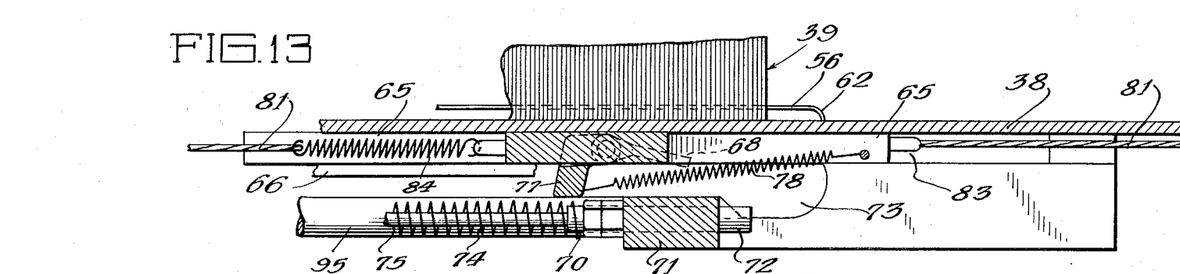
Fig. 13, a fragmentary sectional view taken as indicated on line 13—13 of Fig. 10 showing the separating mechanism being returned toward its cocked retracted position.
Figure 15:
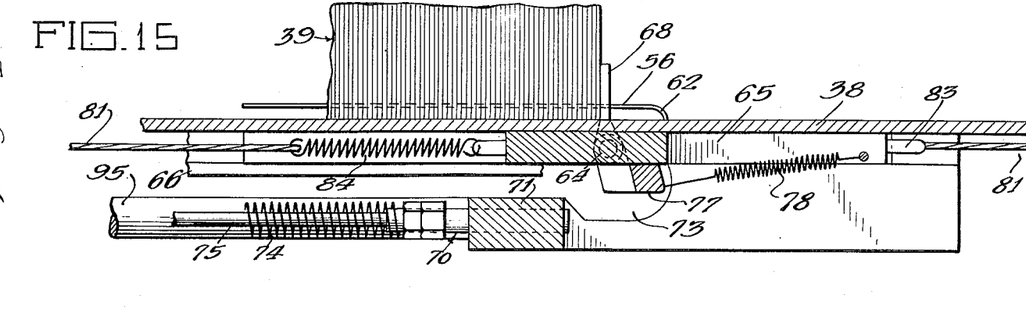
Fig. 15, a view similar to Fig. 13 showing the divider element of the separating mechanism in extended position and the trigger member in retracted position.

Referring to Figs. 13, et seq., an elongated plunger-like trigger member 70 is slidably received in a trigger bracket 71, and its end portion 72 is normally urged into an exposed position in a recess 73 in the bracket 71 by a coil spring 74. A connecting cable 75 joins the trigger member 70 to a manual hand-grip 76. By pulling on the hand-grip the trigger member may be removed from its exposed position in the recess 73, as best shown in Fig. 15.

Figure 14:
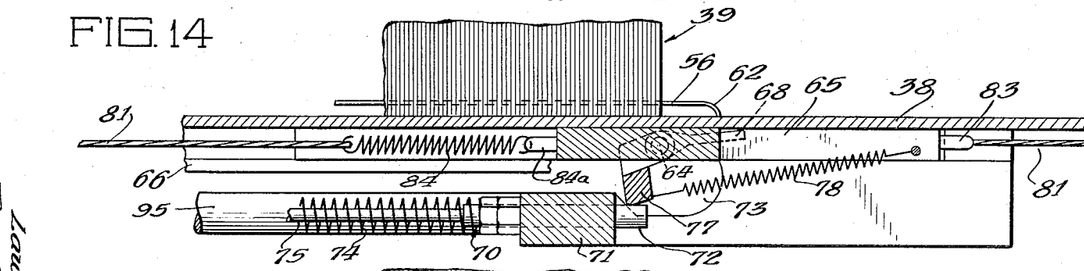
Fig. 14, a view similar to Fig. 13 showing the separating mechanism in cocked retracted position.

The divider member 63 has a trigger-engaging portion or latch block 77 which rests on the end portion 72 of the trigger member to hold the divider member in retracted position. Tension springs 78, secured to the latch block 77 and to the traverse member 65, normally urge the divider element toward its extended position. As best seen in Figs. 14 and 15, when the trigger member 70 is retracted, the divider element 63 is free to pivot in the recess 73 toward extended position under the action of tension springs 78.

Figure 1:
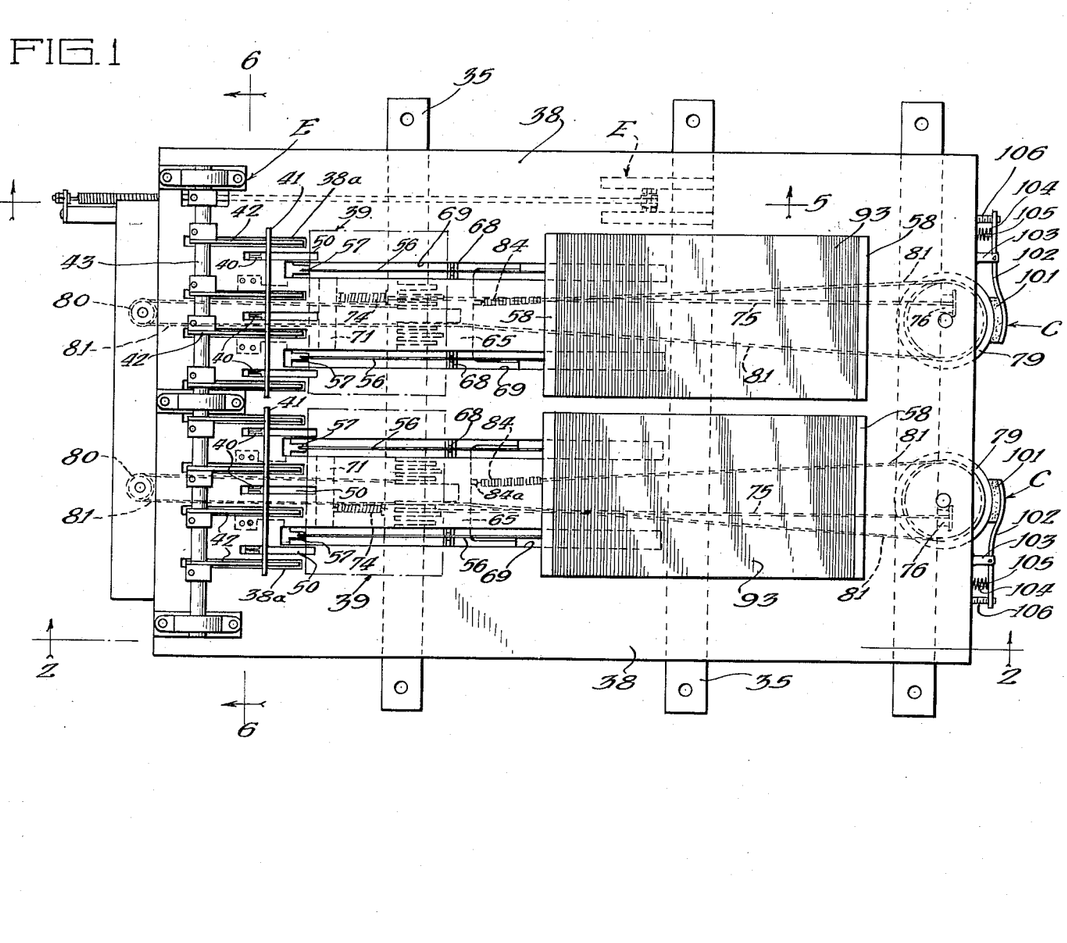
Fig. 1 is a top plan view of the signature bundling machine showing two packs of signatures being formed.

As seen in Figs. 1 and 9, the yieldable braking device C to regulate the slidability of the bundle separating mechanism includes a pair of pulleys 79 and 80 mounted at opposite ends of the signature bundling machine. A cord or cable 81 is trained over both pulleys, passes through a passage 82 in the traverse member 65, and has one of its ends secured to a side of the traverse member 65 by a plug 83. The other end is attached to a coiled spring 84 which in turn is secured to the other side of the traverse member 65 at 84a. A friction brake shoe 101 is operably associated with one of the pulleys, herein shown as pulley 79. The brake shoe 101 is secured to one end of a lever 102 which is pivotally mounted on a pair of ears 103 extending outwardly of the table 38. A pin 105 impales a spring 104 which is held under compression between the other end of the lever 102 and the table 38 so that the brake shoe 101 is normally urged into frictional engagement with the pulley 79. An adjusting screw 106 is provided on the other end of the lever 102 and joins this end to the table 38.

Rotative advancement of the screw 106 inwardly of the table 38 compresses the spring 104 to regulate the frictional engagement between the brake shoe 101 and the pulley 79. Proper adjustment of the braking device in this manner will permit the finger members 68 when in extended position, to hold the remainder of the pack 85 in place as a bundle length 86 is separated, and yet allow the fingers 68, and the traverse member 65 mounting them, to recede step by step as new signatures are added to the remainder of the pack 85 by the pusher plate 36.

A safety control device, generally designated D, and seen in Figs. 2, 7 and 8, is provided to prevent the release of the divider member by the trigger 70 when the pusher plate is adding a signature to the pack. The device comprises a cam 87 which has a flat side 89 and is keyed to the drive shaft 44. A lever 90, attached at one end to the connectng cable 75 and pivoted at 91 to the frame 35, is positioned so that its free end 92 contacts the cam when the cable is pulled; and only when the flat side 89 of the cam is adjacent the lever can the lever and cable be moved far enough to retract the trigger 70 and release the divider member 63. Since the cam 87 rotates in timed relation to the reciprocation of the pusher plate 36, the flat side 89 is never exposed to the lever 90 when the pusher plate is in rearward position adding a signature to the pack.

When it is desired to separate a bundle length of signatures from the pack assembled on the table, the divider member 63 is released by pulling the manual hand-grip 76 and cable 75 to retract the trigger member 70, as best seen in Figs. 14 and 15.

Figure 12:
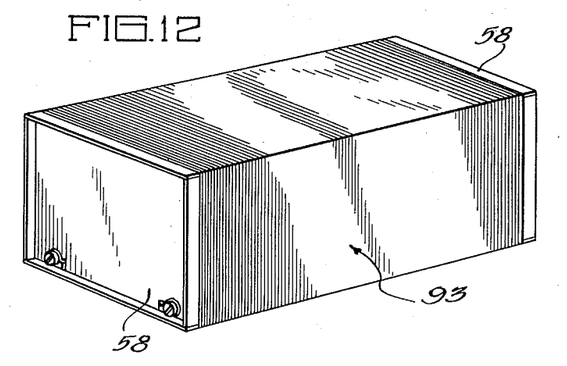
Fig. 12, a perspective view of a completed signature bundle or log.
Figure 20:
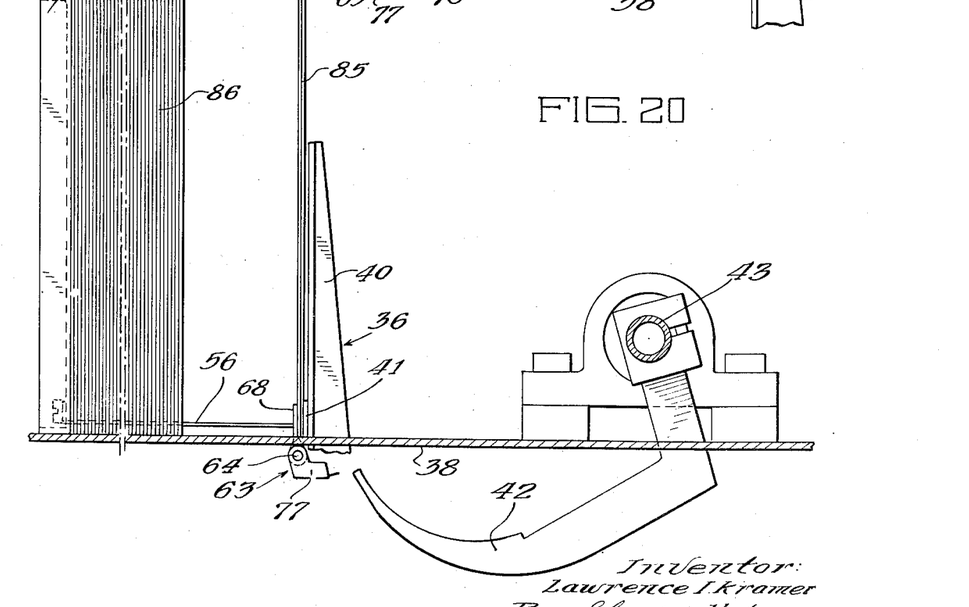
Fig. 20, a fragmentary side elevational view, partly in section, showing the pusher plate adding a signature to the pack with the divider member in extended position and the bundle length pulled away from the divider member.
Figure 21:
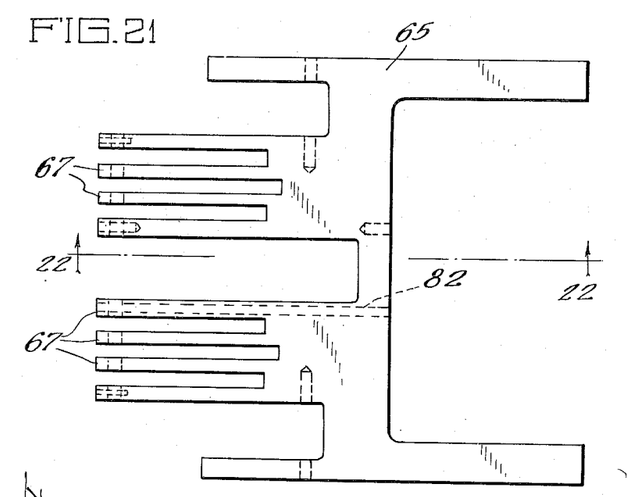
Fig. 21, a top plan view of the base support for the divider member.
Figure 22:
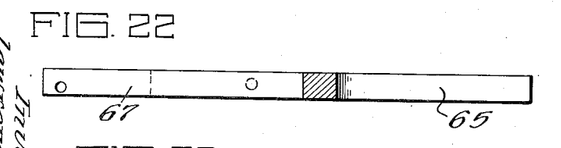
Fig. 22, a sectional view taken as indicated on line 22—22 of Fig. 21.
Figure 23:
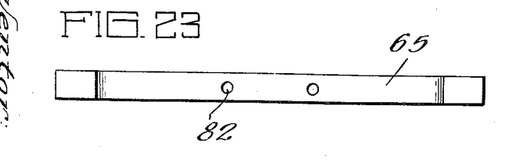
Fig. 23, an end elevational view of Fig. 21.
Figure 24:
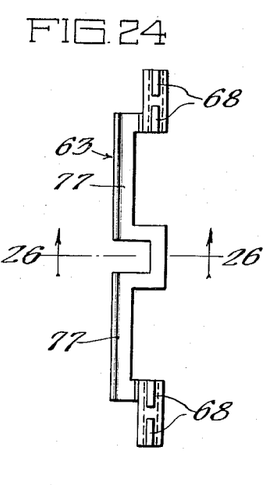
Fig. 24, a top plan view of the divider element.
Figure 25:
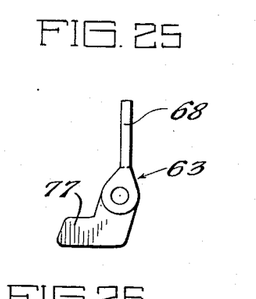
Fig. 25, an end elevational view of the divider element.
Figure 26:
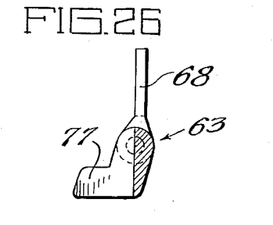
Fig. 26, a sectional view taken as indicated on line 26—26 of Fig. 24.
Figure 27:
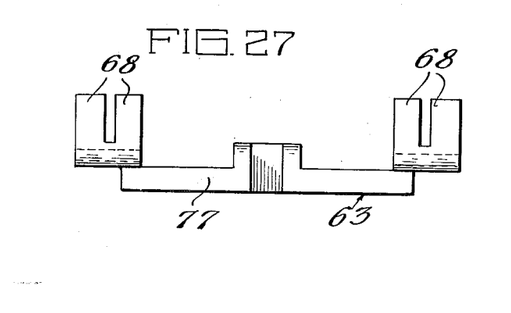
Fig. 27, a side elevational view of the divider element.

Referring to Fig. 20, the bundle length 86 and the segment of wire which it occupies are next pulled away from the remainder of the signature pack, the frictional engagement between the wire and the large number of signatures in the bundle length causing the bundle length and wire to move as a unit. During this movement the divider member 63 holds the remainder of the pack 85 in place so that the wire is drawn through the slits in the signatures forming the remainder. Ordinarily the bundle length is pulled away only after the remainder of the pack is about an inch long so as to be self sustaining; but in Fig. 20 the remainder is shown as very short for clarity of illustration. The remainder of the pack is then allowed to build up so that the divider member recedes as the pusher plate adds more signatures to the pack. Finally slack is built up in the exposed wire between the bundle length 86 and the remainder of the pack 85, as seen in Fig. 19. An abutment plate 58 is then placed on the bundle length to complete the formation of the signature bundle or log 93, as shown in Figs. 12 and 19. Next the divider element is manually withdrawn from the remainder of the pack, and a second similar abutment plate 58 is put on the rearward end of the remainder 85. The wire may then be severed between the newly completed bundle 93 and the remainder 85, and the signature bundle may be carried away to a distant point for storage or collating with other signatures for binding into a book or magazine.

Figure 16:
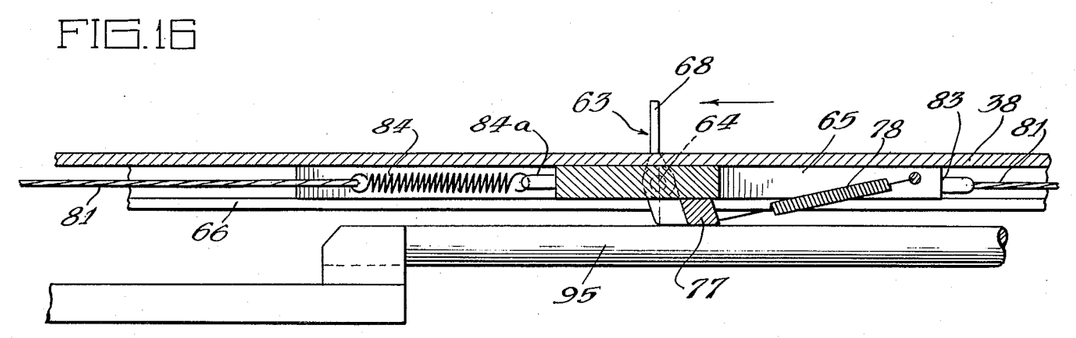
Fig. 16, a view similar to Fig. 13 showing the divider element being moved toward the location at which it may be retracted, preparatory to being returned to cocked retracted position.
Figure 17:
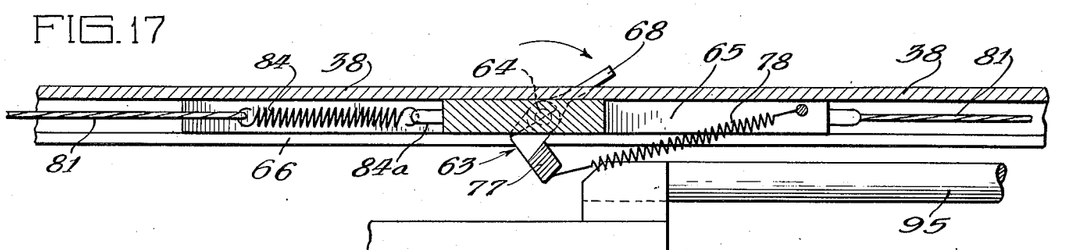
Fig. 17, a view similar to Fig. 13 showing the divider element being turned from its extended position.
Figure 18:
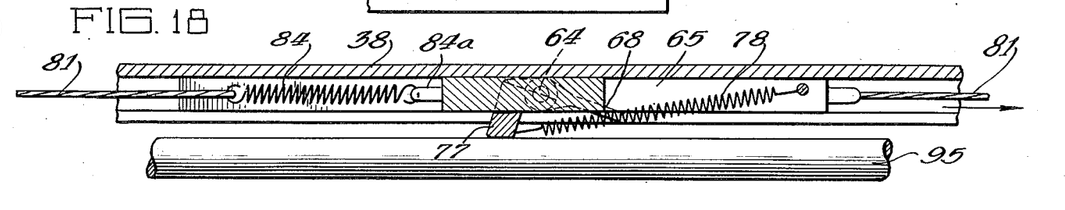
Fig. 18, a view similar to Fig. 13 showing the divider element being moved toward cocked retracted position.

The traverse member 65 and divider 63 are then slid manually rearwardly of the machine until the divider clears the longitudinal bar 95 fixed beneath the table surface, as seen in Fig. 16. The divider member 63 may then be turned clockwise, as seen in Fig. 17, against the tension of the springs 78, and pushed forwardly of the machine so that the latch block 77 bears on the bar 95 and holds the divider member 63 below the table surface. The traverse member 65 in which the divider member 63 is pivoted may then be moved forwardly with the divider member riding on the bar 95 by turning the brake pulley 79. Figs. 13, 14 and 18 portray the return of the divider member to cocked position. Figs. 13 and 18 show it being moved forwardly, and Fig. 14 depicts the divider member just after it has ridden off the longitudinal bar so that the latch block 77 is resting on the tip of the trigger member 70 in cocked position again. In this position further forward movement of the traverse member 65 is prevented by abutment of the fingers 67 with a portion of the table, and rearward movement is prevented by the forward end of the longitudinal bar 95 which lies behind the latch block 77.

The foregoing detailed description is given for clearness of understanding only and no unnecessary limitations should be understood therefrom, for some modifications will be obvious to those skilled in the art.

I claim:

1. In a signature bundling machine having a table to receive slitted signatures slidably on a wire under the action of a pusher plate, mechanism for separating a bundle length from the remainder of a constantly growing pack of signatures, comprising: retractable divider means supported by the table, said divider means being movable between a retracted position free of a pack of signatures on the table and an extended position between signatures of the pack to separate a pack of signatures on the wire into a bundle length and a remainder; traverse means for moving the divider means longitudinally of the table; and yieldable braking means to hold said divider means against gross movement longitudinally of the table while permitting it to move gradually under the action of the pusher plate adding signatures to the pack, whereby a bundle length and the wire occupied by it may be drawn away from the remainder and the divider means by permitting the wire to slide through the slits in the remainder.

2. In a signature bundling machine having a table to receive slitted signatures slidably on a wire under the action of a pusher plate, mechanism for separating a bundle length from the remainder of a constantly growing pack of signatures, comprising: a guideway extending longitudinally of the table; a traverse member mounted in said guideway for movement longitudinally of the table; a retractable divider member mounted on said traverse member and adapted for movement between a retracted position free of a pack of signatures on the table and an extended position between signatures of the pack to separate a pack of signatures into a bundle length and a remainder; and yieldable braking means operably connected to the traverse member to hold said traverse member and divider member against gross movement longitudinally of the table while permitting said members to move gradually under the action of the pusher plate adding signatures to the pack, whereby a bundle length and the wire occupied by it may be drawn away from the remainder and the divider member by permitting the wire to slide through the slits in the remainder.

3. Mechanism for separating a pack of signatures into bundle lengths as specified in claim 2, in which means are provided for varying the yieldability of the braking means.

4. Mechanism as specified in claim 2, in which the braking means comprises a pair of pulleys, each secured at opposite ends of the table, a cord encircling both of the pulleys, opposite ends of said cord being attached to the traverse member and a brake shoe mounted at one end of the table and adapted to engage frictionally one of said pulleys, said brake shoe normally being spring-urged into engagement with said one pulley to hold the traverse member and divider member against gross movement longitudinally of the table while permitting said members to move gradually under the action of the pusher plate adding signatures to the pack, whereby a bundle length and the wire occupied by it may be drawn away from the remainder and the divider member by permitting the wire to slide through the slits in the remainder.

5. Mechanism as specified in claim 2, in which the divider member in extended position is interposed between the pusher plate and the last signature added to the pack.

6. Mechanism as specified in claim 2, in which a safety control device is provided to prevent the divider member from moving from retracted to extended position when the pusher plate is adding a signature to the pack.

7. Mechanism as specified in claim 2, in which the divider member has a finger at one end adapted to extend into the pack and a trigger-engaging portion at the other end to hold said member in retracted position, said divider member being pivotally secured to the base support, and a tension spring joins the base support and trigger-engaging portion normally to urge said finger toward extended position.

8. Mechanism as specified in claim 7, in which a retractable trigger member is mounted on said signature bundling machine adjacent the trigger-engaging portion of the divider member, said trigger member being normally spring-urged toward engagement with said trigger-engaging portion to hold said divider member in retracted position.

9. In a signature bundling machine having a table to receive slitted signatures slidably on a wire under the action of a reciprocating pusher plate, mechanism for separating a pack of signatures into bundle lengths, comprising: a guideway extending longitudinally of the table; a base support mounted in the guideway for movement longitudinally of the table; a retractable divider member mounted on the base support and having a finger at one end adapted to extend into the pack and a trigger-engaging portion at the other end; a trigger member mounted on the bundling machine, one end of said trigger member adapted to engage releasably said trigger-engaging portion to hold said divider member in retracted position, and the other end connected to a gripping portion to permit manual retraction of said trigger member from engagement with said portion, said trigger member being spring-urged toward engagement with said portion; drive means to impart reciprocatory movement to said pusher plate;

and a safety device operably connected to said trigger member to prevent retraction of said trigger member when said pusher plate is adding a signature to the pack.

10. Mechanism as specified in claim 9, in which the safety device comprises a rotary cam member operating in timed relation to the drive means and pusher plate, said cam member having a flat side on its periphery, and a lever pivoted centrally to said bundling machine and at one end to said trigger member, the other end of said lever adapted to contact the peripheral surface of said cam member when said trigger member is pulled toward its retracted position, retraction of the trigger member from engagement with the trigger-engaging portion being possible only when the pusher plate is in its rearward position and the flat side of said cam member is rotated to a position adjacent said lever to permit pivotal movement of said lever against said flat side.

11. The method of separating a bundle length of signatures and the segment of wire occupied thereby from a constantly growing pack of signatures which have slits slidably engaging a continuous run of wire, comprising: segregating from the growing pack of signatures a bundle length containing enough signatures that the total frictional force between said bundle length and the segment of wire occupied thereby will cause the bundle length and the wire to move as a unit, while leaving in the constantly growing pack such a small remainder of signatures that the wire may slide through the slits in said remainder; holding the remainder yieldably so that it may move only as a new signature is slidably engaged with the wire; moving the bundle length and the wire occupied thereby bodily away from the remainder by sliding the wire through the slits in the remainder; and cutting the wire between the bundle length and the remainder.

12. The method of claim 11 including the step of adding new signatures to the remainder after the bundle length has been moved away from the remainder so that the remainder is moved a substantial distance to form a bight in the wire between the bundle length and the remainder before the wire is cut.

13. The method of claim 11 including the steps of placing abutment plates against the adjacent ends of the bundle length and the remainder after the wire is cut, and securing one of the cut ends of the wire to each abutment plate.

14. In a signature bundling machine having a table to receive slitted signatures slidably on a wire under the action of a pusher plate, mechanism for separating a bundle length from the remainder of a constantly growing pack of signatures, comprising: a guideway extending longitudinally of the table; a traverse member mounted in said guideway for movement longitudinally of the table; a retractable divider member mounted on said traverse member and adapted for movement between a retracted position free of a pack of signatures on the table and an extended position between signatures of the pack to separate a pack of signatures into a bundle length and a remainder; means for providing remote adjustment of the longitudinal movement of said traverse member in said guideway; and yieldable braking means holding said traverse member and divider member against gross movement longitudinally of the table while permitting said members to move gradually under the action of the pusher plate adding signatures to the pack, whereby a bundle length and the wire occupied by it may be drawn away from the remainder and the divider member by permitting the wire to slide through the slits in the remainder.

15. In a signature bundle machine having a table to receive slitted signatures slidably on a pair of laterally spaced, longitudinally extending wires under the action of a pusher plate, mechanism for separating a bundle length from the remainder of a constantly growing pack of signatures, comprising: a guideway extending longitudinally of the table; a traverse member mounted in said guideway for movement longitudinally of the table; a retractable divider member mounted on said traverse member and having a pair of laterally spaced projections, said projections being movable between a retracted position free of a pack of signatures on the table and an extended position between signatures of the pack to separate a pack of signatures into a bundle length and a remainder; and yieldable braking means operably connected to the traverse member to hold said traverse member and divider member against gross movement longitudinally of the table while permitting said members to move gradually under the action of the pusher plate adding signatures to the pack, whereby a bundle length and the wires occupied by it may be drawn away from the remainder and the divider member by permitting the wires to slide through the slits in the remainder.

16. Mechanism as specified in claim 15, in which each of the projections is bifurcated so as to straddle each of the wires when the projections are moved to extended position between signatures of the pack.

No references cited.